United States Patent
Battaglia et al.

(10) Patent No.: US 8,468,004 B2
(45) Date of Patent: Jun. 18, 2013

(54) METHODS OF USE OF A NONWOVEN KERATINOUS TISSUE MIMIC

(75) Inventors: Tina Marie Battaglia, North Weymouth, MA (US); Sandra Lou Murawski, Fairfield, OH (US); Louis Fay Wong, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 180 days.

(21) Appl. No.: 12/873,851

(22) Filed: Sep. 1, 2010

(65) Prior Publication Data

US 2011/0060577 A1    Mar. 10, 2011

Related U.S. Application Data

(60) Provisional application No. 61/239,908, filed on Sep. 4, 2009.

(51) Int. Cl.
*G06G 7/58* (2006.01)
*G01N 33/48* (2006.01)
*G01N 31/00* (2006.01)

(52) U.S. Cl.
USPC ................................ 703/12; 702/19; 702/22

(58) Field of Classification Search
None
See application file for complete search history.

(56) References Cited

U.S. PATENT DOCUMENTS

| 5,727,948 A | 3/1998 | Jordan |
| 6,383,220 B1 | 5/2002 | van Blitterswijk et al. |
| 2007/0128255 A1 | 6/2007 | Belcher et al. |

FOREIGN PATENT DOCUMENTS

WO    WO 01/92382 A1    12/2001

OTHER PUBLICATIONS

PCT International Search Report with Written Opinion in corresponding Int'l appln. PCT/US2010/047641 dated Apr. 27, 2011.

*Primary Examiner* — Eric S Dejong
(74) *Attorney, Agent, or Firm* — Jay A. Krebs

(57) ABSTRACT

In one embodiment, a method of modeling interactions with keratinous tissue may comprise the steps of providing a nonwoven mimic and performing an act on the mimic as may be performed on keratinous tissue. The nonwoven mimic has a surface energy representative of keratinous tissue. In another embodiment, a method of modeling interactions with keratinous tissue may comprise the steps of: providing a mimic comprising from about 60% or greater rayon, from about 40% or less polyester, and a surface energy representative of keratinous tissue; and performing an act on the mimic as may be performed on keratinous tissue. The mimic is preferably a nonwoven mimic.

16 Claims, No Drawings

METHODS OF USE OF A NONWOVEN KERATINOUS TISSUE MIMIC

CROSS REFERENCE TO RELATED APPLICATIONS

This application claims the benefit of U.S. provisional application No. 61/239,908, filed Sep. 4, 2009.

FIELD OF THE INVENTION

The present invention relates to methods of use of a nonwoven artificial substrate having at least one property representative of mammalian keratinous tissue.

BACKGROUND OF THE INVENTION

Many consumer products are applied to the skin or hair, and/or involve the sensory experience of touching. Consumer preferences are influenced by a multitude of factors, including product effectiveness, the feel of the product, fragrance, durability, ease of rinsing, etc. One way to determine consumer preferences is by conducting consumer marketing tests, in which a representative group of consumers, or panelists, provide feedback after using a product. Consumer marketing tests have several drawbacks, however. Because panelists must be appropriately selected and compensated for their time, such tests are expensive and time consuming. Human feedback is inherently subjective, and may raise concerns about reliability. Products must be safe for human testing, and the analyses that can be performed after application also are limited. There exists a need to reduce testing with panelists and broaden the range of product testing that can be performed, by providing a method of using an artificial substrate having properties of mammalian keratinous tissue to reproduce a range of properties most relevant to a given product.

Some product testing can be performed using model systems. Artificial substrates are available that, to some extent, imitate human skin. Alternatively, keratinous tissue from animals or human cadavers may be used. Whereas these and other available models may be suitable for some types of product testing, all have significant limitations. Cadaver tissue is costly, and neither cadaver nor animal tissue is able to truly mimic various types of living, human tissue.

While currently available artificial substrates provide better models to assess such characteristics, they also have many disadvantages. First, currently available substrates typically comprise more than one layer which may include coatings and textures to allow controlled variation of physical properties representative of keratinous tissue. Second, currently available artificial substrates are expensive, placing constraints on research and development. Third, many currently available artificial substrates require significant labor investment to prepare; those that don't are expensively priced. For example, test preparers must coat the substrate or wash or sterilize the substrates so that they may be reused. Fourth, currently available artificial substrates are generally nonporous and non-absorbent, so they do not truly mimic keratinous tissue responses. There is a desire for a less expensive substrate which is porous and absorbent and which does not require preparation or re-use.

SUMMARY OF THE INVENTION

The present invention meets the aforementioned needs. Applicants have developed methods of use of an artificial substrate having properties of mammalian keratinous tissue—hereinafter referred to as a "keratinous tissue mimic," "mimic," or "KTM." A substance, examples of which are consumer products, can be topically applied to the KTM, which can be analyzed by a wide variety of methods to gain insight into properties of the substance and/or the KTM. The data obtained from the analysis can provide insight into properties such as product deposition, adhesion, cleansing, feel, and appearance, which in turn can be correlated to consumer needs and preferences.

The KTM may be one, double-sided article—unlike layered artificial substrates currently available. The ability to test both sides of one KTM is a huge improvement over one-sided artificial substrates, wherein two pieces need to be glued together in order to test both sides. While prior artificial substrates required various chemical treatments and/or coatings, the KTM does not require treatments or coatings prior to use. Further, the KTM of the present invention is inexpensive and cost-effective. In one estimate, the use of the KTM for a single test is from 140 to 3700 times cheaper than the use of a hair switch and from 80 to 1000 times cheaper than the use of a polyurethane pad or sheet. A huge savings may be realized, especially for an industry or company which requires safety and efficacy testing for many products. Compared to traditional artificial substrates or hair switches, the KTM is so cost effective that it may be disposed of after use, eliminating the need for costly cleaning, sanitizing, and preparation for re-use. While inexpensive enough that a new KTM may be used for each test, the KTM may be effectively cleaned with a variety of solvents without substantial deterioration so that it may be used at least twice. The KTM is porous and absorbent and thus better able to mimic keratinous tissue responses than prior artificial substrates.

The KTM and methods of the present invention offer several advantages over consumer marketing tests. Importantly, the KTM reduces the need to use human test panels. The KTM is robust, fast and inexpensive to produce, and easy to store and use. Testing can be performed more rapidly, and can more easily be repeated, resulting in increased throughput, efficiency and reproducibility. After a substance has been applied, the KTM can be analyzed using standard physical and analytical methods, which results in more objective and reproducible data than can be obtained from panelists. A wide variety of analyses can be performed, including destructive analyses, which are not possible to perform on panelists. In addition, the KTM physical properties can be selected that are beyond the parameters typically observed in human skin, which would, for example, allow mechanistic studies to be performed.

The following represent non-limiting embodiments of a KTM of the present invention. In one embodiment, the present invention is directed to a method of modeling interactions with keratinous tissue, comprising the steps of providing a KTM in the form of a nonwoven substrate and performing an act on the substrate as may be performed on keratinous tissue. Preferably, the nonwoven substrate has a surface energy similar to that of keratinous tissue. In another embodiment, the present invention is directed to a method of modeling interactions with keratinous tissue, comprising the steps of providing a KTM in the form of a substrate comprising from about 60% or greater rayon, from about 40% or less polyester, and a surface energy similar to that of keratinous tissue; and performing an act on the substrate as may be performed on keratinous tissue. In another embodiment, the present invention is directed to a device for modeling interactions with keratinous tissue, comprising a KTM in the form of a substrate comprising from about 60% or greater rayon, from about 40% or less polyester, and a surface energy similar to that of keratinous tissue; and an instrument used to model interactions with keratinous tissue. Preferably, the substrate and instrument are in physical contact.

DETAILED DESCRIPTION OF THE INVENTION

All percentages are by weight of the personal-care composition, unless otherwise specified. All ratios are weight ratios, unless specifically stated otherwise. All such weights as they pertain to listed ingredients are based on the active level and do not include carriers or by-products that may be included in commercially available materials, unless otherwise specified. The number of significant digits conveys neither limitation on the indicated amounts nor on the accuracy of the measurements. All measurements are understood to be made at about 25° C. and at ambient conditions, where "ambient conditions" means conditions under about one atmosphere of pressure and at about 50% relative humidity. All ranges are inclusive and combinable; therefore, every range given throughout this specification will include every narrower range that falls within such broader range as if such narrower ranges were all expressly written herein.

"Substance," as used herein, may be a product, for example a consumer product, a natural substance, and/or an imitation of a natural substance. The consumer product may be marketed, intended to be marketed, or have the potential to be marketed to consumers. Examples of consumer products include, but are not limited to, personal-care products; pharmaceutical products and/or compositions comprising pharmaceutical ingredients; neutraceuticals, for example vitamins, minerals, herbal products and other plant extracts and/or compositions comprising neutraceuticals; fabric care products, including softeners, detergents, cleansers, whiteners, and deodorizers; household cleansing products, such as dish detergents, surface cleaners, disinfectants, and soaps; and combinations of any of the foregoing. Examples of natural substances include, but are not limited to, water, bodily fluids such as blood, menstrual fluid, urine, breast milk; bodily waste, such as feces and mucosal secretions; plant products, for example, grass stains, pollen and other allergens; and combinations of these and/or any of the aforementioned products. Alternatively, a substance may be an imitation of any of the aforementioned natural substances, which has properties similar to those of interest in the natural product. Alternatively, the substance may be one that may stain under given circumstances, non-limiting examples of which include ink, wax crayons, dyes and colorants, etc.

"Personal-care product," as used herein, means products suitable for topical application on mammalian keratinous tissue and/or onto an artificial substrate. Examples include, but are not limited to, skin-care, cosmetic, grooming, and hair-care products; non-limiting uses of which include antiperspirants, deodorants, lotions (e.g. hand lotion and body lotion), skin-care products (e.g., face and neck lotions, serums, sprays), perfumes and perfume raw materials, sunless tanners, cosmetics (e.g., foundation, concealer, blush, lipstick, lip gloss), depilatories, shampoos, conditioning shampoos, hair conditioners, hair dyes, styling agents, bleaches, colorants, body washes, moisturizing body washes, shower gels, skin cleansers, cleansing milks, hair and body washes, in-shower body moisturizers, pet shampoos, shaving preparations, after-shaves, razor moisturizing/lubricating strips, razor shave-gel bars, bar soaps, cleansing products, feminine-care products, oral-care products, baby-care products, and combinations thereof.

"Topical application," as used herein, means to apply or spread a product onto the surface of living keratinous tissue and/or onto an artificial substrate as described herein.

"Keratinous tissue," as used herein, refers to keratin-containing layers disposed as the outermost protective covering of mammals, e.g., skin, hair, and nails.

"Artificial substrate," as used herein, means a substrate derived from synthetic materials—for example polyurethane—and/or from naturally occurring materials—for example collagen—which has a non-naturally occurring, or man-made, final form.

"Keratinous tissue mimic" "mimic," and "KTM," as used herein, refer to one or more artificial substrates which may have one or more physical properties representative of keratinous tissue. The artificial substrate should have a technical rational behind why it can be used in place of keratinous tissue for testing (e.g., similar surface energy) as well as having performance measures that strongly correlate to consumer or in-vivo testing. These can be used for imaging product coverage as well as be used as the sensor part of a performance test method. When more than one material is present, the materials may be homogenously mixed, may form discrete areas, and/or may form discrete layers. "Homogenously mixed," as used herein, means that the artificial substrate materials are combined such that the chemical and physical properties of various areas of the artificial substrate are substantially uniform.

"Physical properties representative of keratinous tissue," or grammatical equivalents thereof, as used herein, means physical and/or chemical properties (e.g., surface energy, texture, surface area) that are substantially similar to keratinous tissue and that may be relevant to a particular product or substance. For example, if skin is found to be hydrophobic and positively charged, the KTM also may be hydrophobic and positively charged.

"Nonwoven" refers to a layer of individual fibers or threads that are interlaid, but not in a precisely identifiable manner as in a knitted or woven web. Nonwovens may be made via processes known in the art, including those that comprise the following non-limiting examples. Fiber-laying processes of use may include, but are not limited to: carding, airlaying, and wetlaying. Processes comprising filament spinning from resin and integrated web-forming include, but are not limited to: spunbonding, meltblowing, conforming, and forming spunbond-melt-blown-spunbond composites. Fiber-bonding processes of use may include, but are not limited to: spunlacing (i.e. hydroentanglement), cold calendaring, hot calendaring, air-thru bonding, chemical bonding, needle punching, and combinations thereof. Nonwovens exclude paper, tissue paper, and products which are woven, knitted, tufted, or stitch-bonded.

"Fiber" as used herein, refers to staple fibers, fibers longer than staple fibers that are not continuous, and continuous fibers, which are sometimes referred to in the art as "substantially continuous filaments" or simply "filaments."

"Modeling," as used herein, means to simulate, or approximate, an interaction between a substance and keratinous tissue such as absorption, adhesion, adsorption, appearance (e.g., changes in physical properties such as color, opacity, odor, texture, feel), cleansing, covalent bonding, deposition, dispersion, tactile perception, etc., by applying at least one substance of interest to a KTM. Data obtained from analysis of the KTM and/or substance may then be correlated to desired properties of the product, e.g., as determined by consumer preferences.

"Analysis," as used herein, means analysis of chemical and/or physical properties of an artificial substrate and/or a substance that has been applied to the substrate. Analysis may be quantitative and/or qualitative, and occur through a variety of means that would be known to one of skill in the art, including but not limited to instrumental, chemical, and sensory analyses.

"Basis weight," as used herein, means the weight per unit area of an artificial substrate. One method of determining basis weight, therefore, is to weigh a known area sample that is representative of the artificial substrate. The units of basis weight are typically expressed as grams per square meter (gsm) or as ounces of material per square yard. Fiber diameter may be expressed in microns, or in the case of staple fibers, denier, which is defined as the number of grams of fiber per 9,000 linear meters of fiber.

I. Keratinous Tissue Mimic

The keratinous tissue mimic (KTM) of the present invention provides numerous advantages over previous artificial substrates. The KTM is preferably porous, breathable, and absorbent, unlike previous artificial substrates. This enables the mimic to provide a better model to assess characteristics such as product absorption, adsorption, rinseability, and the look and feel of a product upon application. Also, the KTM of the present invention has a higher surface area than currently available artificial substrates. This enables more interaction with substances. Additionally, the KTM of the present invention is durable and may be used to test a series, or regimen of successive products, such as a cleanser, a moisturizer, and an after shave.

In one embodiment, the KTM is in the form of a nonwoven sheet having two substantially planar, parallel surfaces, and a substantially uniform thickness. In another embodiment, the KTM may be in the form of a human body part, non-limiting examples of which include a head, face, arm, leg, hand, foot, finger, toe, upper torso, lower torso. In another embodiment, the KTM is in the form of tow fibers and resembles a sample of human hair, such as a swatch or ponytail. In another embodiment, the form of the KTM resembles mammalian fur. The fibrous KTM may range in thickness from tow fiber to the thickest available commercially. In one embodiment, the fiber diameters may be sized according to desired hair diameters. In another embodiment, the fiber diameters are smaller than actual hair diameters. A fiber of the present invention may have a diameter from about 60 microns to 140 microns, or from about 80 microns to about 120 microns, or about 100 microns. A fiber of the present invention may have an average length from about 3 mm to about 3 inches, or from about 6 mm to about 15 mm, or about 1.5 inches. Average fiber length refers to the length of the individual fibers if straightened out. In another embodiment, the fiber length is continuous and sizeable according to the application. While not necessary, one of ordinary skill in the art would recognize that multiple layers of the KTM may be used, or a coating may be imparted to the KTM, for example, to modify surface energy.

The KTM of the present invention may comprise non-thermoplastic fibers, thermoplastic fibers, or mixtures thereof. "Non-thermoplastic fiber" as used herein, refers to a fiber that does not act as a thermoplastic fiber which softens or melts upon exposure to heat and returns to its original state when cooled to room temperature. Nonlimiting examples of non-thermoplastic fibers include regenerated cellulose, such as rayon, which in turn includes but is not limited to viscose, lyocell, and mixtures thereof. "Thermoplastic fiber" as used herein, refers to a fiber that softens or melts upon exposure to heat and returns to its original state when cooled to room temperature. Non-limiting examples of thermoplastic fibers include polyester and copolymers of polyester; polypropylene and copolymers of polypropylene; polyethylene and copolymers of polyethylene; polyamide and copolymers of polyamide; aliphatic polyesteramide; lactic acid polymer; lactide polymer; polyhydroxyalkanoate fibers; and mixtures thereof. Preferred thermoplastic fibers are polyester and polypropylene fibers. In a preferred embodiment, the KTM comprises rayon, polyester, or a combination thereof. In one embodiment, the rayon is lyocell. Lyocell, commercially available as TENCEL from Lenzing, Inc., is processed differently from other types of rayon and is commonly used in sports apparel because it is soft, breathable, and it is able to wick away moisture. Lyocell is strong whether dry or wet. It will be recognized by one of skill in the art that fibers similar with properties similar to lyocell will also work. In one embodiment, the polyester is polyethylene terephthalate (PET).

In one example of the present invention, a nonwoven KTM comprises greater than about 95% by weight on a dry fiber basis of non-thermoplastic fibers. In another example of the present invention, a nonwoven KTM comprises greater than about 95% by weight on a dry fiber basis of thermoplastic fibers. In a preferred embodiment, the nonwoven KTM comprises both non-thermoplastic and thermoplastic fibers. The nonwoven KTM may comprise about 60% or greater, or about 70% or greater, by weight of the nonwoven KTM on a dry fiber basis of non-thermoplastic fibers. The nonwoven KTM may comprise about 40% or less, or about 30% or less, by weight of the nonwoven KTM on a dry fiber basis of thermoplastic fibers. Such a mimic is commercially available from Polymer Group Inc. In one embodiment, the nonwoven KTM comprises about 70% rayon and about 30% polyester by weight.

Mechanical bonding may be employed to yield the nonwoven KTM of the present invention. One process for producing the nonwoven KTM of the present invention is spunlacing, also known as hydroentanglement. Spunlacing technology is a known method of producing nonwovens, and involves laying down a matrix of fibers, for example as a carded web, and entangling the fibers to form a coherent web, or nonwoven. In some embodiments, the fibers have lengths from about 3 mm to about 3 inches. In a particular embodiment, the fibers are staple fibers. Entangling is typically accomplished by impinging the matrix of fibers with high pressure water from a plurality of suitably-placed water jets, often referred to as hydroentangling. In theory, other fluids can be used as the impinging medium, such as compressed air. The fibers of the web are thus entangled, but not physically bonded to one another—the fibers are basically held together by friction. The fibers of a spunlaced nonwoven, therefore, have more freedom of movement than fibers of webs formed by thermal or chemical bonding. Without being bound by theory, needle punching and other methods where friction holds fibers together may also work.

Keratinous tissue mimics of the present invention have a dry basis weight of at least 40 gsm. Alternatively, the basis weight may be from about 50 grams per square meter (gsm) to about 180 gsm, or from about 75 gsm to about 165 gsm, or from about 100 gsm to about 150 gsm. A person of skill in the art will recognize that the gsm could be higher than the aforementioned ranges. In particular, a preferred KTM is about a 125 gsm nonwoven KTM comprising about 40% 1.5 denier polyester fibers and about 60% 1.5 denier rayon fibers.

The KTM, whether nonwoven or fibrous, demonstrates one or more physical properties that are representative of keratinous tissue. The property or properties of interest will vary according to factors that include, but are not limited to, the type of keratinous tissue, the environment of the keratinous tissue, the individual consumer, the substance that is being applied to the keratinous tissue and/or the product with which the keratinous tissue comes into contact. Examples of representative properties include, but are not limited to, form, surface energy (for example, hydrophobicity and hydrophilicity), surface charge, surface reactivity, texture, elasticity, hardness, appearance, and combinations thereof. Physical properties representative of keratinous tissue may be imparted to the mimic via various processing techniques. The properties can be controllably varied by, for example, the material composition and/or coating layer, and by varying parameters (e.g., thickness, pattern, or plasma treating the surface).

The KTM may be rigid or pliable. The KTM may be elastic or inelastic. The KTM may be colored, white, or colorless, and may be transparent or opaque. In one embodiment, the KTM may be similar in color to a desired type of keratinous tissue, for example, the KTM may be similar in color to human skin. The KTM may be altered to resemble various degrees and types of pigmentation found in human hair or skin.

The KTM may have an average surface energy that is representative of keratinous tissue. Herein, the surface energy of the KTM is understood to mean the average surface energy of a representative area of the KTM, although localized variations may occur due to such factors as variation of deposition of coating materials (e.g., proteins and lipids) and texture. The surface energy of the KTM correlates to hydrophobicity and hydrophilicity, and may be representative of, for example, the moisture content of skin. The surface energy of the KTM is derived from contact angle measurements, which can be converted to surface energy by various accepted models that would be known to one of skill in the art. One such model, used in the present invention, is the Fowkes equation, as described in Fowkes, F. M.: *Industrial and Engineering Chemistry*, vol. 56, number 12, p. 40 (1964): $\gamma_{lv}(1+\cos\theta)=2(\gamma_{lv}^{d}\gamma_{sv}^{d})^{1/2}+2(\gamma_{lv}^{p}\gamma_{sv}^{p})^{1/2}$ where $\theta$ refers to the contact angle; $\gamma_{lv}$ refers to the surface tension of the liquid; $\gamma_{lv}^{d}$ refers to the dispersive component of the surface tension of the liquid; $\gamma_{lv}^{d}$ refers to the dispersive component of the surface tension of the solid; $\gamma_{lv}^{p}$ refers to the polar component of the surface tension of the liquid and $\gamma_{sv}^{p}$ refers to the polar component of the surface tension of the solid. The contact angles of the KTMs of the present invention can be measured using diiodomethane (99%, Aldrich), ethylene glycol (99%+, Aldrich) and water (HPLC grade, Aldrich).

The total surface energy of the KTM is the sum of the dispersive surface energy component and the polar surface energy component, which is thought to affect properties such as adhesion of substances to the KTM. For example, the total surface energy of a scalp, lip, face, neck, or fingertip may range from about 31 mJ/m² to about 51 mJ/m²; the total surface energy of a forearm may range from about 29 mJ/m² to about 33 mJ/m²; the total surface energy of hair may range from about 18 mJ/m² to about 29 mJ/m². For further surface energy comparisons, please see the Comparative Examples below. In one embodiment, the KTM has a total surface energy of from about 10 mJ/m² to about 55 mJ/m², alternatively from about 15 mJ/m² to about 50 mJ/m², alternatively from about 15 mJ/m² to about 30 mJ/m², alternatively from about 30 mJ/m² to about 50 mJ/m², alternatively from about 25 mJ/m² to about 35 mJ/m², where "mJ" means 1×10⁻³ Joules and "m²" means square meters. In one embodiment, the KTM has a polar surface energy component of from about 0 mJ/m² to about 25 mJ/m². Alternatively, the polar surface energy component is from about 0 mJ/m² to about 5 mJ/m², alternatively from about 5 mJ/m² to about 15 mJ/m², and alternatively from about 15 mJ/m² to about 25 mJ/m².

The KTM may have an average surface charge that is representative of keratinous tissue. Herein, the surface charge of the KTM is understood to mean the average surface charge of a representative area of KTM, although localized variations may occur due to such factors as variation of deposition of coating materials (e.g., proteins and lipids) and texture. The surface charge of the KTM may be positive, negative, or neutral, and is largely determined by the presence of ionic species, including acidic and basic species. The surface charge determines, for example, the polarity of the keratinous tissue, which in turn may affect deposition and adhesion of various substances on the KTM. The net surface charge may be measured by determination of the isoelectric point and/or the zeta-potential of the KTM. A variety of means of determining the zeta-potential may be employed and would be known to one of skill in the art. The KTM, or a coating thereon, may have a surface reactivity that is representative of keratinous tissue. Surface reactivity is understood to include an increased tendency to react with, or alternatively to bond to, a given compound. Surface reactivity may be determined by a variety of methods, including, for example, measurement of binding coefficients. In contrast to surface charge, which relates to the presence of ionic species, surface reactivity is understood to encompass other types of chemical interactions, for example, covalent interactions.

"Texture," as used herein, means a series of impressions and/or elevated areas, relative to the average height of the planar surface of the textured layer. The KTM of the present invention inherently has a texture. This texture may vary and/or incorporate different patterns. In some embodiments, the KTM may have little to no intended texture. In other embodiments, the KTM may comprise at least one textured surface to mimic a desired type of keratinous tissue. The KTM material may be curable, moldable, imprintable, etchable, engravable, or otherwise capable of being imparted with a desired textured surface. When present, the texture may comprise a plurality of impressions and/or elevated areas that may be patterned and/or may be randomly arranged. The impressions may be in the form of, for example, lines or grooves, the depth of which may vary depending upon the type and condition of skin upon which the KTM is modeled.

In one embodiment, the impressions have a depth of from about 0.001 mm to about 10 mm, alternatively from about 0.001 mm to about 0.1 mm, alternatively from about 0.1 mm to about 1 mm, and alternatively from about 0.1 mm to about 0.5 mm, as measured from the average height of the planar surface of the KTM. The texture may be visible without the use of visual aids (i.e., on a macroscopic level), or may be clearly visible only with visual aids such as a magnifying glass or microscope set at a 10× or 100× magnification setting.

In various embodiments, the texture mimics the topography of mammalian skin, or human skin, or mammalian hair, or human hair, or combinations thereof. Alternatively, the texture mimics a composite of topographies of skin from a plurality of individuals, representative of an average skin type of a given population. The texture may resemble the topography of skin on essentially any body part. The topography of the texture may vary to resemble degrees of wrinkling of skin. Alternatively, the depth of the impressions may vary to resemble skin ranging from relatively smooth (for example, oral mucosal linings) to deeply lined (for example, elbows or deep facial lines), and further may resemble scaly, fissured, rough, and/or otherwise visibly-textured skin. The texture may resemble the topography of healthy skin or skin damaged by, for example, exposure to UV-rays, chemicals, and/or illness. Alternatively, a KTM may comprise discrete areas having different textures, for instance non-imaged, tricot, and square designs.

In contrast to previously available models, the texture of the KTM used in the present invention can more closely mimic a wide variety of keratinous tissues, and is reproducible.

Texture may be important in determining, for example, product deposition and coverage, in particular in areas of keratinous tissue having wrinkles and deep lines. Texture also may be important in determining whether a given product is effective, for example, in dark, moist environments produced by deep lines and folds of skin.

Texture may result from structures in the KTM itself, non-limiting examples of which include particulates and fibers. The texture analyzer described below is a useful tool for measuring the feel—which may include the roughness, softness, and ease of glide of a mimic. In one embodiment, the nonwoven KTM is planar and has no intentional pattern.

II. Method of Use

The present invention describes methods of use of the keratinous tissue mimic (KTM) described herein. The methods of the present invention may be performed under static conditions or with dynamic movement, at room temperature, or at body temperature. Alternatively, the KTM may be pre-conditioned to specified environmental conditions, for example, temperature, humidity, UV-radiation, light, exposure to additional substances, etc.

A substance may be applied directly to the KTM, for example with one's hand or with a delivery enhancement device, non-limiting examples of which include an implement, such as a sponge or sponge-tipped applicator, a spray applicator, a brush, and combinations thereof. Or, a substance may be applied by transfer from an article of manufacture or second KTM. Alternatively, the substance may be applied with the aid of an energy delivery device, such as an ultrasonic, ultraviolet, or heat energy delivery system.

A wide variety of amounts of substance may be applied to the KTM, and will depend upon such factors as the substance and the intended use thereof. In one embodiment, the amount of substance applied is the amount of a particular substance that a consumer is instructed to topically apply, or alternatively, the amount of a substance that a consumer would reasonably be expected to topically apply. Alternatively, the amount of substance applied represents an amount that would be expected to occur as a result of bodily functions, or of physical activities, for example, sweat resulting from physical activity or stains in clothing resulting from playing outdoors. In one embodiment, the amount applied to the KTM is from about 0.1 mg/cm$^2$ to about 1.0 g/cm$^2$, alternatively from about 0.5 mg/cm$^2$ to about 0.5 g/cm$^2$ and alternatively from about 1 mg/cm$^2$ to about 0.1 g/cm$^2$. A person of skill in the art will recognize that an appropriate dose for a given substance may vary from these ranges.

The methods of use may comprise a method of product evaluation, wherein a substance is applied to the KTM or wherein the KTM is used in instrumentation capable of measuring force, for example, frictional force. Alternatively, a substance may be applied and an article of manufacture subsequently brought into contact with the KTM, for example, to measure the absorbency of the article of manufacture. Alternatively, the KTM may be used in instrumentation for purposes such as measuring frictional force, sensing, etc. The method further may comprise the step of performing one or more analyses of the KTM, the article of manufacture, and/or the substance of interest. The methods of use further may comprise modeling the deposition and/or adhesion of a substance onto keratinous tissue. Other properties of products that may be modeled by applying a substance to a KTM as described herein include, but are not limited to, glide; greasiness; stickiness; smoothness; stability of a product and/or substance; changes in physical properties such as color, opacity, odor and texture; and combinations of any of the foregoing.

In one embodiment, the interaction that is modeled is deposition of a substance onto mammalian skin. A substance may be applied to the KTM, and the retention of the substance or a component thereof on the KTM may be assessed. Retention also is understood to include the uniformity of deposition, for example, the uniformity of the thickness of an applied substance, or of the concentration of a given substance per unit of area. Retention also may be assessed by monitoring the release of a substance after deposition, for example, the release over time of a perfume raw material. Alternatively, the substance not deposited onto the KTM (for example, the substance retained on an applicator) may be analyzed. In one embodiment, the applied substance is at least partially removed from the KTM prior to analysis of the substance and/or KTM. Removal may occur, for example, by rinsing with water or other solvents, wiping, and/or blotting with a second article of manufacture, evaporation, etc. Alternatively, the remaining substance may be eluted or otherwise removed from the KTM using appropriate chemical means, and optionally the amount of substance in the eluent determined. Alternatively, a method is provided for determining the effectiveness of electrospray deposition of substances. For example, a substance may be applied to a KTM as described herein by means of electrospray deposition, and suitable analyses performed as described herein.

In one embodiment, the interaction that is modeled is cleansing, or removal, of a substance from mammalian skin. One non-limiting example of a method for evaluating the cleansing capability of a product includes the steps of applying a first substance to a KTM to form a substance-coated KTM; applying a second substance, for example, a cleansing composition, to the KTM by rinsing, wiping, dipping, rubbing, or other suitable means; and analyzing the KTM to assess or to quantify the amount and/or type of substances remaining on the KTM. Alternatively, the second substance may be applied to a wipe, for example, a non-woven wipe, to form a wipe product. Alternatively, the second substance may be applied by means of a delivery enhancement device. Alternatively, the method may comprise the step of applying energy to the substance-coated KTM. In one embodiment, the first substance is a cosmetic and/or skin care composition. Alternatively, the first substance is a natural or imitation substance such as sebum, dirt or other impurity. Alternatively, the first substance is a chromophore, an ink, or a similar substance that may produce a permanent or semi-permanent marking. In one embodiment, the second substance is water, a solvent, a personal-care product, and combinations thereof.

Alternatively, a method of consumer product evaluation is provided, comprising the steps of applying a substance to a surface of a KTM to form a substance-coated surface, generating a first set of data by performing at least one analysis of the substance-coated surface, and comparing the data to a second set of data. The second set of data may be obtained, for example, after applying a substance to a KTM described herein or elsewhere, by analyzing mammalian skin, and/or may comprise consumer preferences. Optionally, after comparing the data, the substance may be modified to produce a more desirable comparison, and the steps of the method of product evaluation repeated at least once.

Alternatively, the KTM may be used as a calibration standard for instrumental measurements. The KTM, or alternatively a series of substantially similar KTMs may be made having a desired property, for example texture, form or appearance, as described herein. The KTM(s) may include a series of markings having a measured dimension. The measured dimensions may vary incrementally. Examples of suitable markings include, but are not limited to, lines having a measured depth and/or length to represent wrinkles; indentations having a measured diameter and/or depth, representing pores; discrete areas of color having measured size, absorbance and/or refraction, to represent pigmentation and overall skin tone. The standards may be analyzed by a suitable instrument to produce a calibration curve, which may be used to quantify the same characteristic on, for example, keratinous tissue.

III. Examples

The following six examples of shave preparation products are given solely for the purpose of illustration and are not to be construed to limit scope of the present invention as there are many other substances which may be tested with the keratinous tissue mimic of the present invention.

different levels of hydroentanglement). All correlated well with the actual human hair results, with all eight $R^2$ values above 0.87 (ranging from 0.87 to 0.99) for each differently processed material. Similarly, when silicone from shampoo was deposited on hair and on a nonwoven KTM (see Test Method 1 below), there was also a very high correlation ($R^2$=0.98). This demonstrates that products perform similarly when on hair or on the nonwoven KTM. Additionally, there was a high correlation between consumer perception of a shaving preparation helping a razor glide smoothly over the face (based on consumer scoring) and the actual help a shave preparation gives to a razor to enable it to glide smoothly over the face (see Test Method 3 below). A high $R^2$ value of 0.88 showed the use of a nonwoven KTM for an in-vitro test of glide was correlated to consumer response and can be used to predict consumer acceptance of glide for shave.

The following test methods are a non-exhaustive list of methods of modeling interactions with keratinous tissue. These methods involve the use of a keratinous tissue mimic (KTM) comprising, in one embodiment: from about 60% or greater rayon, from about 40% or less polyester, and a surface energy similar to that of keratinous tissue.

| Ingredient | Ex. 1 Base | Ex. 2 Base | Ex. 3 Base | Ex. 4 Base | Ex. 5 Base | Ex. 6 Base |
|---|---|---|---|---|---|---|
| Water | QS | QS | QS | QS | QS | QS |
| Palmitic Acid | 7.75 | 6.0 | 0 | 0 | 6.0 | 0 |
| Triethanolamine | 6.05 | 4.7 | 8.76 | 8.76 | 4.7 | 8.76 |
| Stearic Acid | 2.6 | 2.0 | 0 | 0 | 2 | 0 |
| Myristic Acid | 0 | 0 | 14.0 | 14.0 | 0 | 14.0 |
| Mineral Oil kaydol | 0 | 0 | 0 | 0 | 1.5 | 0 |
| Glyceryl Oleate | 2.0 | 2.0 | 1.5 | 1.5 | 2.5 | 1.5 |
| Sorbitol (70% solution) | 1.0 | 1.0 | 0 | 0 | 0.5 | 0 |
| Hydroxyethylcellulose | 0.5 | 0.3 | 0.75 | 0.75 | 0.3 | 0.75 |
| Polyox WSR-301 (PEG-90M) | 0.06 | 0.06 | 0 | 0 | 0.06 | 0 |
| Polyox WSR-N-12K (PEG-23M) | 0.05 | 0.05 | 0 | 0 | 0.05 | 0 |
| Sodium Myristoyl Sarcosinate (30%) | 1.0 | 0 | 6.67 | 6.67 | 0 | 6.67 |
| Polymer LR30M cationic | 0.1 | 0.2 | 0.45 | 0.45 | 0.2 | 0.45 |
| Fragrance | 0.85 | 0.85 | 0.85 | 0.85 | 0.85 | 0.85 |
| PVP K60 (45% solution) | 0 | 0 | 0.49 | 0.49 | 0 | 0.49 |
| Glycerin | 0.5 | 1.5 | 8.5 | 8.5 | 0.5 | 8.5 |
| Colorant | 0.002 | 0.002 | 0.002 | 0.002 | 0.002 | 0.002 |
| Parts of Base Mixed w/Lathering Agent | 97.15 | 97.15 | 96 | 97.15 | 97.15 | 100 |
| Volatile Lathering Agent | 2.85 | 2.85 | 4.0 | 2.85 | 2.85 | 0 |

The above examples can be made as follows: Mix the water with glycerin and then add to this mixture a pre-blend of the LR30M and hydroxyethylcellulose powders. For formulas containing sodium myristoyl sacrosinate, add this component next. For formulas containing PVP K60, add this component next. Mix until homogeneous and start heating. Stop mixing, and then add the fatty acids. When the temperature reaches 75° C., add triethanolamine and mix for approximately 10 more minutes. Cool to less than 35° C., and then add the fragrance and colorant. For example 6, store in closed container until it is charged into an appropriate dispenser. For examples 1-5, combine the base composition with the lathering agent and charge the mixture into containers or packages capable of containing volatile agents.

IV. Test Methods

Eight different samples of 70/30 lyocell/PET nonwoven KTMs were rinse-tested (see Test Method 2 below) and compared to human hair to measure the performance, in terms of friction and feel, of the various nonwoven KTM embodiments. The KTMs comprised different patterns (e.g., tricot and non-imaged) and different tensile strengths (e.g., due to A. Test Method 1

The following describes one example of using a KTM as described herein to determine deposition of an ingredient (e.g., petrolatum, silicone) from a personal care product. Consumers typically express a preference for products which moisturize and lubricate the skin, but which do not have a greasy or tacky feel. Depositing the appropriate amount of substances such as petrolatum is related to these desired properties. A hydrophobic KTM having physical properties similar to dry skin may be used to quantify petrolatum deposition from body wash.

Procedure: Wet the surface of a KTM having a surface area of approximately 8 cm×18 cm and a generic shower puff separately under warm running water having a flow rate of from about 2-5 L/min and a water temperature of from about 35° C.-38° C. for about 5-10 seconds. Dispense approximately 1-5 ml of a rinse-off product onto the KTM surface and spread the rinse-off product onto the surface using a wet finger to ensure sufficiently uniform coverage of the KTM surface. Lightly rub the wetted puff in continuous circular strokes on the KTM surface until a foamy lather is created (about 10 seconds). Allow the lather to remain on the KTM surface for about 15 seconds. Rinse the KTM under running warm water for about 15 seconds. Pat dry with a paper towel, and allow the KTM to air dry at room temperature for about 1-2 minutes. Extract the petrolatum from the KTM surface and analyze by gas chromatography (or an extraction/standard analytical technique suitable for the active ingredient).

One example of a suitable method for extraction and analysis of petrolatum is as follows. Place in a suitable vessel (e.g., a polypropylene centrifuge tube) a representative portion of the KTM to which a rinse-off product has been applied as above, adding a sufficient amount of heptane to immerse the KTM surface. Add an appropriate amount of a suitable internal standard (e.g., squalene). Cap the vessel, shake for several seconds, and vortex for about 30 seconds. Collect the fluid and analyze by gas chromatography. Petrolatum deposition may be quantified by using a multipoint calibration curve constructed from at least five of the most abundant paraffin peaks in a petrolatum standard. Preferably the same type and lot of petrolatum used to formulate the test rinse-off product is used to construct the calibration curve. The paraffin components of petrolatum can be separated on a DB-5HT column (15 m length×0.32 mm diameter, 0.1 μm film thickness) using hydrogen carrier gas with a flow rate of 3.5 mL/min (constant flow) and an appropriate oven temperature program. Detection can be accomplished with a flame ionization detector.

The composition providing a specific level of petrolatum deposition may be subjected to consumer testing. Depending upon the results of the consumer testing, the above protocol may be repeated as needed to selectively identify compositions that provide a more desirable deposition of petrolatum or other desired ingredients.

B. Test Method 2

The following describes one example of using a nonwoven KTM as described herein to assess the rinse feel, or wet feel, of keratinous tissue after deposition of a substance. An in-shower experience may be simulated and the "feel" of a KTM—which may include roughness, softness, and ease of glide—may be measured. This method enables measurement of the coefficient of friction (CoF) of, for instance, shampoos and body washes.

An apparatus designed to simulate the hair rinsing process is connected to an instrument capable of measuring frictional forces (for example, an Instron-type instrument) and containing a load cell of about 1 kg to about 100 kg. The rinsing apparatus comprises: 1) an air-activated clamping device capable of opening and closing to deliver pressures of about 10 psi to about 70 psi to simulate the pressure exerted by hands on hair during rinsing 2) keratinous tissue models as described herein affixed to two opposing sides of the clamping device and 3) one or more spray nozzles capable of delivering water flow rates of from about 50 mL/min to about 1000 mL/min., for simulating shower conditions.

Procedure: Attach the rinsing apparatus to the base of a Stable Micro Systems TA XT Plus™ Texture Analyzer (TA) equipped with a 30 kg load cell, centering or aligning the clamps perpendicular to the load cell. Adjust water flow rate to approximately 200 ml/min and the water temperature to 103° F.+/−2° F., Set the air pressure for the TA clamps to approximately 30 psi. Set the instrument measurement settings as follows: TA settings, tension compression, test speed- 10.0 mm/sec for 130 mm long pull. Set the macro for a total of 21 strokes. Manually turn on the water at the start for 10 minutes. An optional setting is to run 31 strokes with the water only on for the first 10 minutes to collect the damp after rinsing feel. During the test, data (g of force) will only be collected during the upward pull of the treated KTM, not on the return. Cover the pads on both the front and back side of the piston with a polyurethane skin pad (see JP2006233367 for details).

Wet a 2 inch by 9 inch piece of nonwoven KTM or a 4 g swatch of fibrous KTM under hot (~103° F.+/−2° F.) tap water for 30 seconds. Place 0.4 g+/−0.1 g (or 0.4 mL) of body wash or shampoo onto the nonwoven KTM (usually with a syringe) and lather either by hand or using a microdermabrasion tool with a custom pad (e.g., polyurethane skin pad) for 30 seconds. Load the nonwoven KTM into the TA and start the test macro along with the water pump. Initiate a test sequence which 1) instructs the instrument to raise the load cell to which the KTM is attached, at a rate of about 10 mm/sec 2) opens the clamps, and 3) instructs the instrument to lower the load cell. Repeat this sequence until the detected frictional force is constant. Alternatively, a predetermined number of sequences may be executed, for example, 21. Between each sample, wipe the polyurethane skin pads with a piece of nonwoven KTM and an alcohol wipe to remove any possible build-up from the previous test. Run at least three tests for each sample in order to do a statistical analysis. By calculating the total friction in grams of force (or other suitable unit of force) for rinse friction, products may be ranked relative to each other to assess which products would be expected to have the most pleasant feel.

C. Test Method 3

The following describes one example of using a nonwoven KTM as described herein for measuring the in-shave lubrication (in grams of force) of a shave preparation. Reducing friction is important during the shave because a high friction skin surface results in bulging of the skin.

When the skin bulges, the blade is more likely to engage the skin, increasing the chance for skin irritation. Therefore, by reducing friction the product helps protect the skin. In addition, lower friction results in less drag on the skin, which can also be a potential source of irritation. This method enables measurement of the coefficient of friction (CoF) of a shave preparation.

An apparatus designed to simulate the hair rinsing process is connected to an instrument capable of measuring frictional forces (for example, an Instron-type instrument) and containing a load cell of about 1 kg to about 100 kg. The rinsing apparatus comprises: 1) an air-activated clamping device capable of opening and closing to deliver pressures of about 10 psi to about 70 psi to simulate the pressure exerted by hands on hair during rinsing 2) keratinous tissue models as described herein affixed to two opposing sides of the clamping device and 3) one or more spray nozzles capable of delivering water flow rates of from about 50 ml/min. to about 1000 mL/min., for simulating shower conditions.

Procedure: Attach the rinsing apparatus to the base of a Stable Micro Systems TA XT Plus™ Texture Analyzer (TA) equipped with a 30 kg load cell, centering or aligning the clamps perpendicular to the load cell. Adjust water flow rate to approximately 200 ml/min and the water temperature to 103° F.+/−2° F. Set the air pressure for the TA clamps to approximately 30 psi. Set the instrument measurement settings as follows: TA settings, tension compression, test speed- 10.0 mm/sec for 130 mm long pull. Set the macro for a total of 10 strokes. Run the first five strokes without the water on, then manually turn on the water for 2 min 15 sec for the second five strokes. During the test, data (g of force) will only be collected during the upward pull of the treated KTM, not on the return. Cover the pads on both the front and back side of the piston with a polyurethane skin pad (see JP2006233367 for details).

Wet a 2 inch by 9 inch piece of nonwoven KTM under hot (~103° F.+/−2° F.) tap water for 30 seconds. Place 2 g+/−0.1 g of aerosol shave gel or 1 g+/−0.1 g of aerosol shave foam onto the nonwoven KTM and gently lather and spread by hand for 30 seconds. Rub excess foam on the back of the nonwoven KTM. Load the nonwoven KTM into the TA and start the test macro. At the end of the fifth stroke, turn on the rinse water. Initiate a test sequence which 1) instructs the instrument to raise the load cell to which the KTM is attached, at a rate of about 10 mm/sec 2) opens the clamps, and 3) instructs the instrument to lower the load cell. Repeat this sequence until a predetermined number of sequences may be executed, for example, 10. Between each sample, wipe the polyurethane skin pads with a piece of nonwoven KTM and an alcohol wipe to remove any possible build-up from the previous test. By calculating the total friction in grams of force (or other suitable unit of force) for dry friction and rinse friction, products may be ranked relative to each other to assess which products would be expected to have the most pleasant feel.

D. Test Method 4

The following describes one example of using a nonwoven KTM as described herein for measuring the post-shave lubrication (in grams of force) or conditioning of a shave preparation.

This method also works with a fibrous KTM. Skin conditioning/lubrication can be an important dry feel benefit after use of consumer products such as shave preparations, moisturizers, or after shaves. The dry feel benefit can be measured using an Instron or texture analyzer by measuring mimic-to-mimic interaction (resistance/friction) in both directions. This may be accomplished by applying a constant pressure to nonwoven KTMs while one KTM remains still and the other KTM moves over the stationary piece. This method enables measurement of the coefficient of friction (CoF) of shave preparations, moisturizers, or after shaves.

Procedure: Attach the rinsing apparatus to the base of a Stable Micro Systems TA XT Plus™ Texture Analyzer (TA) equipped with a 30 kg load cell. Calibrate distance so that the TA "home" is at 10 inches. Set the air pressure between the TA probe and stationary vertically-oriented sample-holder to approximately 30 psi. Set the instrument measurement settings as follows: Test Mode=Compression, Pre-Test Speed=20.0 mm/sec, Test Speed=20.0 mm/sec, Post-Test Speed=20.0 mm/sec, Target Mode=Distance, Distance=50.0 mm, Count=5, Trigger Type=Auto (Force), Trigger Force=0.0 g, Advanced Options=Off. Cut the nonwoven KTM vertically into 2 pieces, each 9 inches long by 1 inch wide. Load the nonwoven KTM into the stationary vertically-oriented sample-holder with one piece of the nonwoven KTM on top of the other piece. During the test, data (g of force) will be collected during both the upward pull and return of the treated KTM. Remove the KTMs, turn each piece over, and reload it into the holder in order to measure the opposite side of the KTM.

The data output should be in the form of a graph of time (sec) (x-axis) vs. force (g) (y-axis). To analyze the data, the area within the curve below the x-axis represents the "up stroke mean friction area": the data collected as the probe moves in an upward direction. The area within the curve above the x-axis represents the "down stroke mean friction area": the data collected as the probe moves in a downward direction. By calculating the total friction in grams of force (or other suitable unit of force), products may be ranked relative to each other to assess which products would be expected to have the most pleasant feel.

E. Test Method 5

In one embodiment, a method of product evaluation is provided comprising the step of using a KTM described herein in an instrument capable of measuring frictional force, non-limiting examples of which include tensiometers, such as a Texture Analyzer Plus™, a tribometer, and/or Instron™ instruments. The frictional force in turn may be correlated to the tactile perception, or "feel," of a product; for example, running one's fingers through washed and/or conditioned hair; stroking a washed dish; feeling one's skin after applying a moisturizer; the feel of the mouth, gums, lips, etc. after use of an oral hygiene product; tackiness, softness, glide, slipperiness, oiliness or greasiness, "squeaky clean" feel, etc. A variety of suitable instruments is commercially available or may be assembled, and would be known to one of skill in the art. A KTM of the present invention may be secured to the instrument and used as a sensing element. In one embodiment, a substance may be applied to the KTM to produce a substance-coated first KTM. A substance may be applied to a second substrate, non-limiting examples of which include a KTM as described herein, a sample of artificial skin, a sample of artificial hair, mammalian fur and/or human hair; household goods such as dishes, fabrics; substances representative of household surfaces, etc., to produce a substance-coated second substrate. The first KTM and substance-coated second substrate may be placed in direct contact and moved in a controlled fashion relative to each other. In one embodiment, the movement is repeated. In one embodiment, the movement simulates conditions of actual use. The coefficient of friction is measured as the KTM and substance-coated second substrate are moved. Optionally, a solvent, for example water or a cleansing solution, may be allowed to flow or otherwise contact the KTM prior to and/or during analysis.

V. Comparative Examples

The following chart summarizes surface energy measurements performed as described herein on various substrates.

| Substrate | Dispersive Component of Total Surface Energy (mJ/m$^2$) | Polar Component of Total Surface Energy (mJ/m$^2$) | Total Surface Energy (mJ/m$^2$) |
|---|---|---|---|
| Normal Skin[1] | 30.30 | 0.20 | 30.50 |
| Winter Skin[2] | 29.50 | 0.06 | 29.60 |
| Summer Skin[3] | 29.70 | 3.10 | 32.80 |
| Wet Skin[4] | 25.85 | 11.31 | 37.16 |
| Scalp[5] | 29.30 | 12.70 | 42.00 |
| Lips[5] | 33.00 | 5.50 | 38.50 |
| Cheek before shower[5] | 31.6 | 10.2 | 41.8 |
| Cheek after shower[5] | 25.5 | 1.8 | 27.3 |
| Fingertips[5] | 22.4 | 18.5 | 40.9 |
| Neck[5] | 28.4 | 3.3 | 31.7 |

-continued

| Substrate | Dispersive Component of Total Surface Energy (mJ/m$^2$) | Polar Component of Total Surface Energy (mJ/m$^2$) | Total Surface Energy (mJ/m$^2$) |
|---|---|---|---|
| Bicomponent polyurethane (TC-410)[6] | 47.31 | 2 | 49.31 |
| Polyurethane substrate allyl amine coating layer[7] | 32 ± 1.5 | 12 ± 1.5 | 45 ± 1.0 |
| Polyurethane substrate plasma deposited allyl alcohol coating layer[8] | 28.9 | 12.6 | 41.45 |
| Polyurethane substrate plasma deposited 1,1,1-trimethyl-1-pentene coating layer[9] | 31 ± 1 | 0.5 ± 0.3 | 32 ± 1.0 |
| Polyurethane substrate plasma deposited PFMCH Coating layer[10] | 19 ± 2.0 | 0.6 ± 0.2 | 20 ± 1.0 |
| VITRO SKIN[11] | 31.55 | 8.52 | 40.07 |
| COFFI film[12] | 28.06 | 9.12 | 37.17 |
| BIOSKIN[13] (Black) | 44.5 | 16.2 | 60.6 |
| BIOSKIN[13] (Brown) | 31.0 | 1.36 | 32.36 |

[1]Skin from forearm. Measurements may be made as follows: Shave any hair from skin 2-3 days prior to measurement. Place a drop of desired liquid on the skin, which is positioned horizontally. Capture the contact of the drip with a high speed (e.g., at 0.017 seconds per image) video stream for about 3 seconds. Use suitable software to non-spherically trace the droplets and determine the contact angle, e.g., First Ten Angstroms ™ Model 200 Dynamic Contact Angle Analyzer. Calculate the mean contact angle for both sides of the drop.
[2]"Winter" skin measurement made as described in [1], at a temperature of approximately 0° C., a dew point of approximately −4° C. and a relative humidity of approximately 70%.
[3]"Summer" skin measurement made as described in [1], at a temperature of approximately 24° C., a dew point of approximately 18° C. and a relative humidity of approximately 55%.
[4]Wet skin measurement made after immersion in distilled water for about 5 min. while still immersed. Solvents used to determine contact angles under water were bromonaphthalene, diiodomethane, and hexane. Contact angles converted into surface energy by Augustine Scientific, Cleveland, OH.
[5]Measurements made as described in [1].
[6]See Examples 1 and 2 of US 2007/0288186 A1.
[7]Bicomponent polyurethane with plasma-deposited allyl amine coating layer. Plasma deposition performed using pulsed deposition, as described in Example 4 of US 2007/0288186 A1, using 25 W continuous wave deposition at 40 kHz power.
[8]Bicomponent polyurethane with plasma-deposited allyl alcohol coating layer. Plasma deposition performed using 7 W continuous wave deposition as described in Example 4 of US 2007/0288186 A1.
[9]Bicomponent polyurethane with plasma-deposited 1,1,1-trimethyl-1-pentene coating layer. Plasma deposition performed using continuous wave deposition at 25 W and 40 kHz power.
[10]Bicomponent polyurethane with plasma-deposited PFMCH coating layer. Plasma deposition performed using continuous wave deposition at 25 W and 40 kHz power.
[11]IMS Inc., Orange, CT.
[12]Distributed by Brechteen, Chesterfield, MI.
[13]Beaulax Co., Ltd., Tokyo, Japan.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of modeling interactions with keratinous tissue, comprising the steps of:
   a) providing a nonwoven mimic having a surface energy representative of keratinous tissue; the nonwoven mimic comprising:
      1. from 60% or greater Lyocel, and
      2. from 40% or less polyethylene terephthalate;
   b) applying an amount of substance to the mimic as may be applied to keratinous tissue; and
   c) analyzing the nonwoven mimic to assess interaction of the substance with the mimic.

2. The method according to claim 1 wherein the substance is a shave preparation and the interaction assessed is in-shave or post-shave lubrication.

3. A method of modeling interactions with keratinous tissue, comprising the steps of:
   a) providing a hydroentangled nonwoven mimic comprising:
      1. from about 60% or greater Lyocel, and
      2. from about 40% or less polyethylene terephthalate;
   wherein the mimic has a surface energy representative of keratinous tissue; and
   b) applying an amount of substance to the mimic as may be applied to keratinous tissue; and
   c) analyzing the nonwoven mimic to assess interaction of the substance with the mimic.

4. The method according to claim 3, wherein the interaction is deposition of the substance onto keratinous tissue.

5. The method according to claim 3, wherein the interaction is removal of the substance from keratinous tissue.

6. The method according to claim 3, wherein the interaction is adhesion of the substance to keratinous tissue.

7. The method according to claim 3, wherein the interaction is modeling a regimen of more than one substance.

8. The method according to claim 3, wherein the substance is selected from the group consisting of a consumer product, a natural substance, an imitation of a natural substance, and combinations thereof.

9. The method according to claim 3, wherein the mimic demonstrates a total surface energy of from about 10 mJ/m² to about 55 mJ/m².

10. The method according to claim 3, wherein the mimic has a dry basis weight of between about 50 grams per square meter and 180 grams per square meter.

11. The method according to claim 3, wherein the shape of the mimic is substantially planar.

12. The method according to claim 3, further comprising the steps of:
   a) generating a first set of data by performing at least one analysis of the mimic;
   b) comparing the first set of data to a second set of data; and
   c) generating predictive models based on the data comparison;
   wherein the second set of data is consumer data.

13. The method according to claim 12, wherein the second set of data is obtained by applying a substance to living keratinous tissue and performing at least one analysis of the tissue.

14. The method according to claim 3 wherein the substance is a shave preparation and the interaction assessed is in-shave or post-shave lubrication.

15. A device for modeling interactions with keratinous tissue, comprising:
   a) a nonwoven mimic comprising:
      1. from about 60% or greater Lyocel, and
      2. from about 40% or less polyethylene terephthalate;
   wherein the nonwoven mimic has a surface energy representative of keratinous tissue; and
   b) an instrument used to simulate interactions with keratinous tissue;
   wherein the nonwoven mimic and instrument are in physical contact with one another.

16. The device according to claim 15 wherein the interaction is effectiveness in reducing friction.

* * * * *